April 28, 1970     E. S. TAMM     3,508,326
METHOD OF MANUFACTURING ELECTRO-DYNAMIC MACHINES
Filed Aug. 10, 1967     2 Sheets-Sheet 1

INVENTOR:
EMIL S. TAMM
BY John N. ...
ATTORNEY.

April 28, 1970     E. S. TAMM     3,508,326

METHOD OF MANUFACTURING ELECTRO-DYNAMIC MACHINES

Filed Aug. 10, 1967     2 Sheets-Sheet 2

INVENTOR:
EMIL S. TAMM
BY
ATTORNEY.

United States Patent Office 3,508,326
Patented Apr. 28, 1970

3,508,326
METHOD OF MANUFACTURING ELECTRO-DYNAMIC MACHINES
Emil S. Tamm, Fort Smith, Ark., assignor to Baldor Electric Company, Fort Smith, Ark., a corporation of Missouri
Filed Aug. 10, 1967, Ser. No. 659,726
Int. Cl. H02k 15/00
U.S. Cl. 29—596                                    5 Claims

ABSTRACT OF THE DISCLOSURE

For adjusting the angular position of commutator brushes of dynamo-electric machines, a brush-holder ring is made of plastic material and shaved by an end plate into nesting relation therewith. The brush holder ring has on its surface a series of radially extending protuberances which are shaved off by a cylindrical surface on the end plate when the two are pressed into nesting relationship. The shaved-off protuberances become slide bearings to maintain a tight fit between the ring and the plate, but nonetheless permit easy circumferential adjustment of the ring relative to the plate.

---

The invention relates to dynamo-electric machines, and particularly to the circumferential adjustability of brush holders thereon.

In the construction of electric motors, it is common to provide a metal "rocker arm" or ring upon which the holders for commutator brushes are mounted. Such parts are clamped directly against relative movement during operation, but provision is made for angular adjustment of such arm or ring about the axis of the rotor in order to position the brushes at magnetic neutral. Such rocker arm or brush-holder ring is usually mounted on a metal "end bell" or end plate which also carries the bearing for one end of the rotor shaft, but can, if desired, be mounted on the stator itself. When a brush-holder ring is mounted on the end plate, it is common to provide it and the end bell with mating male and female cylindrical surfaces which, when internested, provide the track along which the parts move relatively to accomplish the aforesaid circumferential or angular adjustment of the brush-holder ring. No matter how truly cylindrical the nesting surfaces may be machined, their fit can be no tighter than a "free running fit" without impairing the ease of their relative movement in the course of circumferential adjustment. Such a free running fit inherently involves some looseness (in the radial direction), and unless such looseness is otherwise overcome, eccentricity will usually result with consequent impairment of commutation and reduction in brush and commutator life. Various mechanical arrangements have heretofore been employed for controlling such radial looseness, but they are complicated and expensive, as well as being cursed with less than optimum accuracy.

It is the object of the invention to overcome the aforesaid deficiencies, and to provide simple and inexpensive brush-holder ring mounting which is easily adjustable and whose concentricity is accurately maintained during adjustment.

To achieve the aforesaid objective, the invention contemplates that the internesting brush-holder ring and the part of the dynamo-electric machine upon which it is mounted, be press fitted together; and that agencies be employed to reduce the frictional resistance to relative circumferential adjustment when the customary clamps are released. Such agencies include any one or all of: making the ring and mounting part of materials which have substantially different hardness; or which have a relatively low coefficient of friction against each other; or which have a relatively small bearing area between each other. Preferably, one of the ring and the part upon which it rides during adjustment, has a bearing face made of plastic material, while the other has a cooperating bearing face made of metal, such as steel. Such provides both the desired differential in hardness and the low coefficient of friction; and the relatively small bearing area may be added by the provision, on the surface of the plastic member which is to be adjacent the cooperating cylindrical metal member, of spaced protuberances which are partially shaved off by the metal member when the two are pressed into nesting relationship, thereby producing a fit with zero clearance. The latter not only produces a made-in-situ press fit, but diminishes the area of contiguousness between the relatively adjustable parts, and hence takes advantage of the axiom that the coefficient of friction is less with great pressures upon small areas than with small pressures upon large areas.

Preferably, the brush-holder ring is made in toto of plastic material, but, if desired, it may be metal, or a composite of metal and plastic if the brush holders are insulated from it, and a plastic ring is laminated to it at the periphery which is addressed toward the complemental (cylindrical) surface of the stationary mounting part, be it end bell, stator frame, or rocker arm. In any event, typical materials from which the plastic ring may be formed are: polyethylene, phenolics, melamines, polyesters, polycarbonates, polysulphones, polyphenoxy, and numerous other molding or casting resins preferably having dielectric properties. On the other hand, if both internesting parts be made of metal, the protuberated part must be softer, or at least shavable by the other part.

An illustrative embodiment of the invention in the form of a direct current motor is illustrated by the accompanying drawings, in which.

Figure 1:
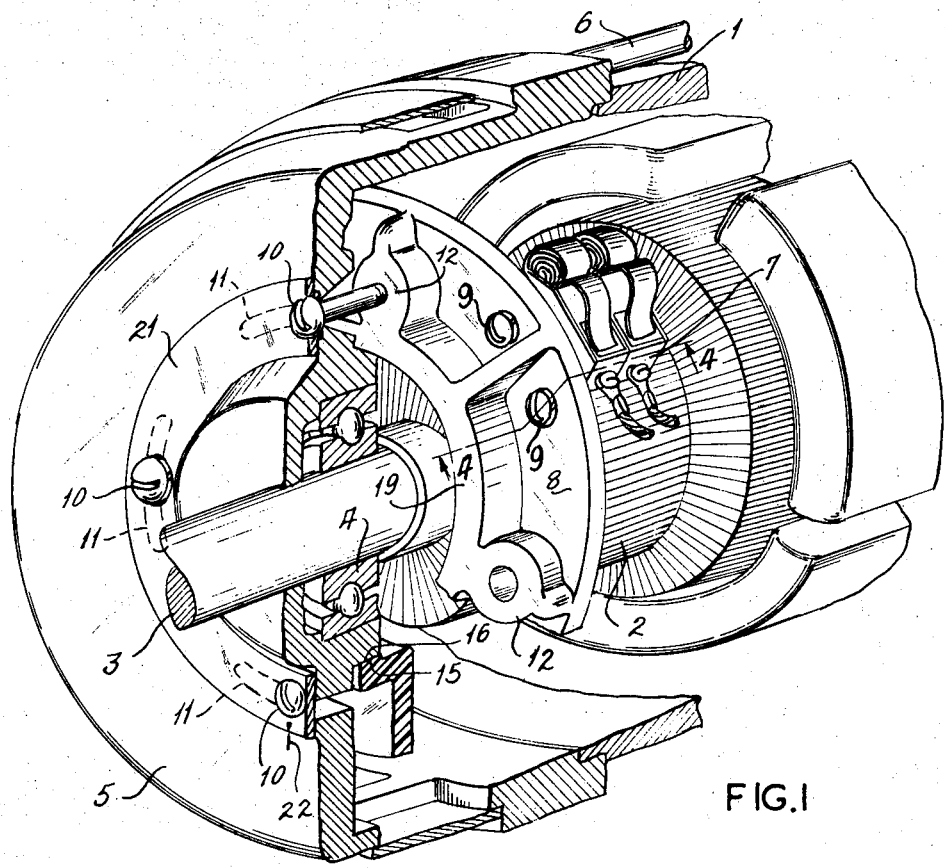
FIGURE 1 is a perspective view of the commutator end of a direct current motor embodying the invention, and with portions broken away to reveal the relationship of parts critical to the invention.
Figure 2:
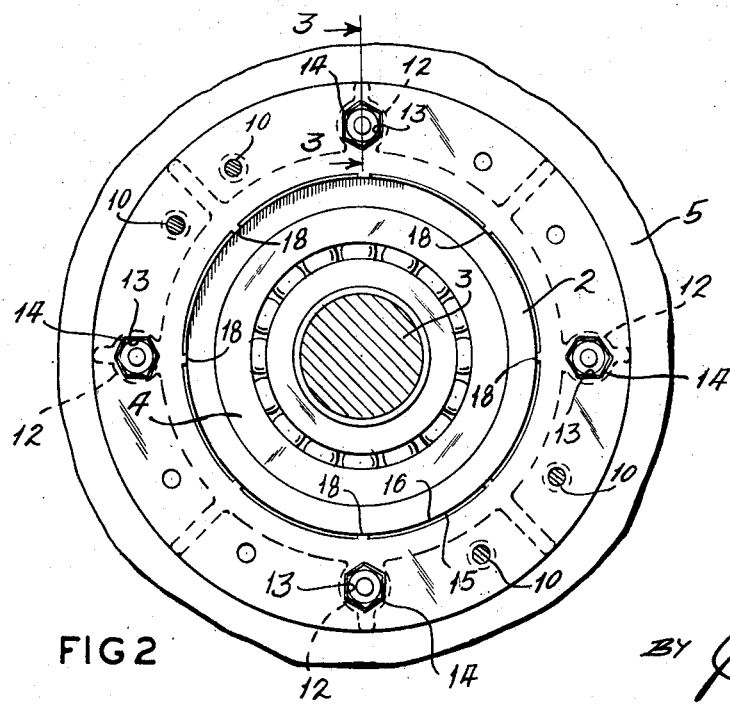
FIGURE 2 is a plan view, taken from the commutator side, of a brush-holder ring assembled with an end plate.

In the embodiment shown in the drawings, the motor is provided with the customary stator 1, having a commutator 2, and mounted upon a shaft 3 in accordance with the usual practice. The shaft 3 is mounted in appropriate bearings 4 carried by an end bell or end plate 5, which latter is secured to its counterpart at the opposite end of the stator 1 by a plurality of through-bolts 6, likewise in accordance with the usual practice, and shown here for illustration only.

Figure 3:
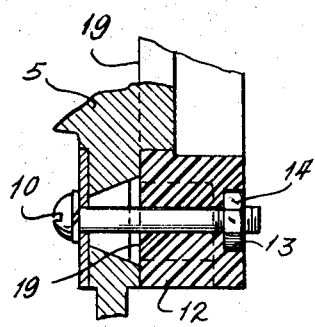
FIGURE 3 is a sectional view taken along line 3—3 of FIGURE 2.
Figure 4:
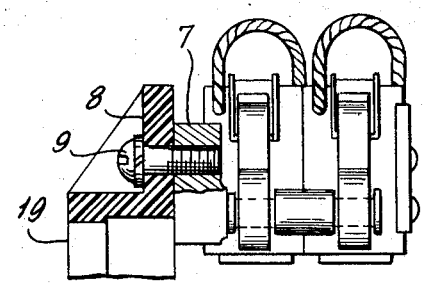
FIGURE 4 is a sectional view taken along line 4—4 of FIGURE 1.
Figure 5:
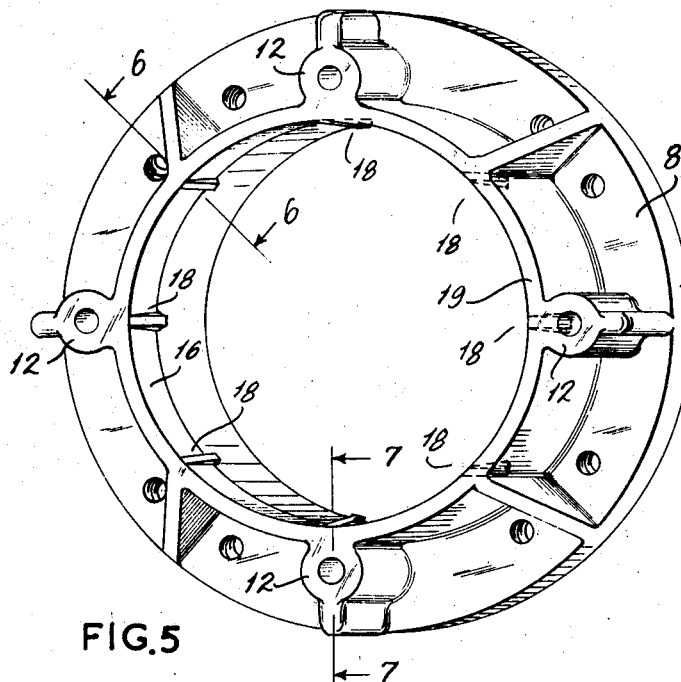
FIGURE 5 is a perspective view of a plastic brush-holder ring constructed in accordance with the present invention.
Figure 6:
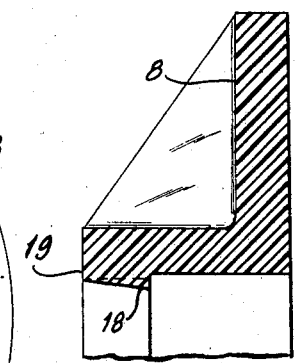
FIGURE 6 is a sectional view taken along plane 6—6 of FIGURE 5.
Figure 7:
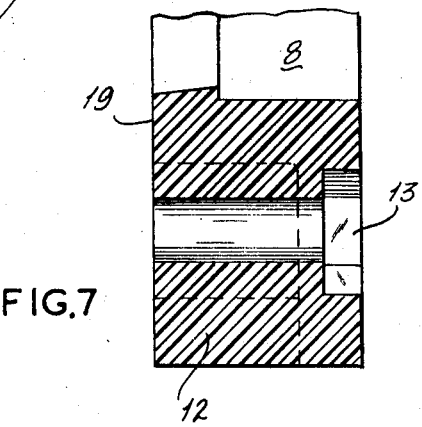
FIGURE 7 is a sectional view taken along plane 7—7 of FIGURE 5.

As shown in FIGURE 1, there is a brush holder 7, of which there are at least two, arranged in diametrically opposed relationship for confining the customary brushes, and maintaining them in contact with the commutator 2. In accordance with the present invention, the brush holder 7 and its counterparts are mounted upon a plastic brush-holder ring 8, and secured thereto by one or more screws 9. The brush-holder ring 8 is adjustably mounted, concentric with shaft 3, upon end plate 5, so as to have limited movement in the circumferential direction relative to the end plate, but with the minimum, preferably zero, freedom for relative movement in the radial direction. In the form shown, a plurality of clamping bolts 10 extend, respectively, through arcuate slots 11, to provide for such relative movement in the circumferential direction. The several bolts 10 extend inwardly, i.e., toward the stator 1 through holes in bosses 12 which form an integral part of the brush-holder ring 8. As shown clearly in FIGURE 3, the back or stator side of each of the bosses 12 is provided with a recess 13, hexagonal in shape, to nest with a hex-nut 14 of size appropriate for interthreading with the respective bolts 10.

In order to minimize radial movement of the brush-holder ring 8 relative to the end plate 5 without impairing the ease of circumferential adjustment, these parts are provided with cooperating male and female surfaces 15 on the end plate and 16 on the brush-holder ring which internest. In the form shown, the surface 15 on the end plate is truly cylindrical (in the practical sense), which surface 16 is substantially cylindrical, but may have deliberate interruption as hereinafter described. As previously pointed out, the invention contemplates that one of these parts be harder than the other, and, in the embodiment illustrated, the brush-holder ring, being made of plastic, is softer than the metal end plate, and hence when those parts are assembled with their substantially cylindrical surfaces 15 and 16 concentric and pressed together in the axial direction, the leading edge 17 (see FIGURE 8) cuts its own seat in the surface 16 of the brush-holder ring, thus producing a fit with zero clearance. Despite the zero clearance, when the plastic of which ring 8 is made is of a character such as to have a relatively low coefficient of friction against the metal of the end plate, relative circumferential movement between the two parts may be accomplished with relative ease.

Figure 8:
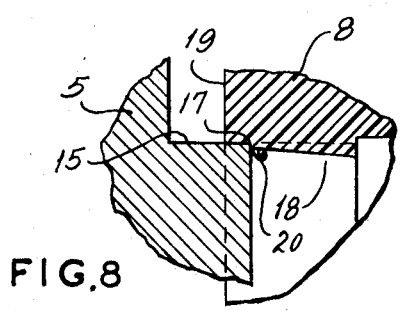
FIGURE 8 is an enlargement of a portion of either FIGURE 6 or FIGURE 7, or both, shown in the process of being assembled with an end plate.

To facilitate the formation in situ of a complementary seat for end bell surface 15 within surface 16 of the brush-holder ring 8, as well as to facilitate the ultimate freedom for relative movement between those parts in the circumferential direction, the invention contemplates that the female surface 16 be provided with a series of equi-spaced protuberances 18 extending radially inward of the cylindrical surface 16 for a distance not in excess of that which can be readily shaved off in the process of assembly. For example, and as illustrated in FIGURE 8 on enlarged scale, the several protuberances 18 preferably slope at an angle of about 10° with reference to the axis of concentricity of the surfaces 15 and 16, so that, adjacent the face 19, the radius of the inner periphery of the several protuberances is greater than the radius thereof toward the opposite face of the brush-holder ring. Thus, in its manufacture, the surface 15 on the end plate may be turned truly circular at a radius whose magnitude is between that of surface 16 in the brush-holder ring and that of the inside surface of protuberances 18. Once the brush-holder ring and the end plate are assembled in concentric relationship and pressed axially together, the corner 17 of surface 15 on the end plate shaves off the increments of the several protuberances 18 which are of lesser radius than the diameter of surface 15 on the end plate to produce a shaving 20 shown symbolically in FIGURE 8.

Preferably, the several proturberances 18 extend peripherally of the surface 15 for a distance amounting to not more than about 5° relative to the axis of concentricity, thereby reducing the area of the surface in contact with surface 15 of the end plate, and reducing the frictional ressistance to relative circumferential movement between the end plate and the brush-holder ring.

By thus assembling the end plate 5 is concentric relationship with the brush-holder ring 8, the bearing surface on the softer member, i.e., the brush-holder ring, is formed in situ to match the surface 15 on the end plate, and since the surface 15 was truly circular to begin with, such concentricity is maintained (without radial play) regardless of circumeferential adjustment of the brush-holder ring relative to the end plae. Accordingly, once the motor has been assembled and tested, if it is found that circumferential adjustment of the position of the brushes is necessary, as, for example, to bring them into alignment with the magnetic neutral of the motor, the several bolts 10 may be relaxed sufficiently to permit the brush-holder ring to be rotated within the limits of arcuate slots 11 to bring the brushes into proper orientation relative to the magnetic neutral of the motor, and then the bolts re-tightened to retain the brush holders in the selected position.

To indicate the degree of adjustment achieved by any such movement of the brush-holder ring while assembled with the end plate, an indicator ring 21, having a graduated scale, may be provided on the outside of the end plate, and if the bolts 10 snugly fit in holes through the indicator plate 21 and through the brush-holder ring which accommodates the bolts 10, the indicator ring will move circumferentially to the same degree that the brush-holder ring is moved relative to the end plate, and accordingly, by the provision of an indicant 22 on the end plate adjacent the zero position of the indicator plate, the degree of adjustment of the brush-holder ring is clearly indicated on the exterior of the motor.

While, in the foregoing description, the brush-holder ring has been described as being made of plastic material which may be precision molded or cast by any one of various known techniques, it will be understood that if the brush-holder ring is electrically insulated from the brush holders, it may be made of electrically conductive material, such as metal, provided one or the other of the brush-holder ring and the end plate is soft enough that the protuberances 18 thereon can be shaved off by the other of such members in the operation of assembling them concentrically together.

While one complete embodiment of the invention has been disclosed in detail, it is not to be understood that the invention is limited to the details of the disclosure save as indicated by the following claims.

Having thus described the invention, what is claimed and desired to be secured by Letters Patent is:

1. In the art of assemblying dynamo-electric machines having a brush-holder ring circumferentially adjustable relative to a stationary part and in which the stationary part and the brush-holder ring have internestable male and female parts of circular shape, the process comprising, forming one of said internesting parts of material having substantially lesser hardness than the other, forming on said one a plurality of circumferentially spaced protrusions projecting radially therefrom in the direction to be engaged by the other of said internestable parts for a distance sufficient to prevent internesting, aligning said internestable parts substtantially concentrically, and pressing said parts axially together until they are internested while simultaneously removing by shaving off with said harder part a part of said protrusions to form bearing surfaces, whereby said harder part cuts its own seat to form a press fit which is substantially free from relative radial movement and is adapted for easy circumferential adjustment between said parts.

2. The process of claim 1 wherein the brush-holder ring has lesser hardness than said stationary part.

3. The process of claim 1 wherein said protrusions are substantially equi-spaced.

4. The process of claim 1 wherein said brush-holder ring is the female part, said stationary part is the male part, and the radius of protrusions is less than the radius of said male part.

5. The process of claim 1 in which the brush-holder ring is formed of plastic material.

References Cited

UNITED STATES PATENTS

| | | | |
|---|---|---|---|
| 2,306,233 | 12/1942 | Smith | 29—525 X |
| 2,989,656 | 6/1961 | Herbst | 310—239 X |
| 3,078,754 | 2/1963 | De Lacy. | |
| 3,215,964 | 11/1965 | Horbach. | |

CHARLIE T. MOON, Primary Examiner

C. E. HALL, Assistant Examiner

U.S. Cl. X.R.

29—432.1, 525; 310—241